Figure 1:
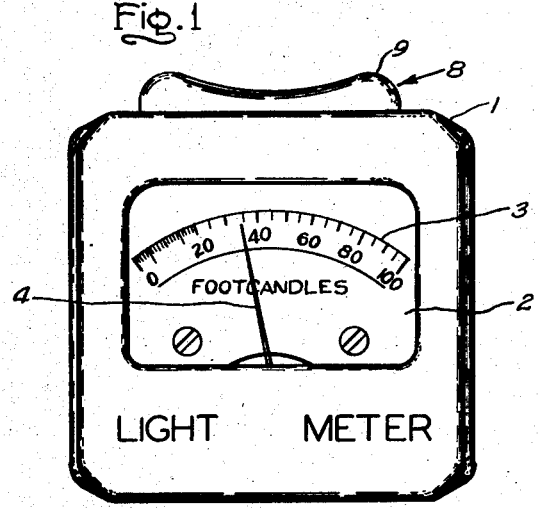

Sept. 19, 1950     G. B. BUCK, II     2,522,987

PHOTOELECTRIC CELL STRUCTURE INCORPORATING A LENS

Filed Aug. 7, 1947

Inventor:
Gaylord B. Buck II,
by Vernet C. Kauffman
His Attorney.

Patented Sept. 19, 1950

2,522,987

UNITED STATES PATENT OFFICE 2,522,987

PHOTOELECTRIC CELL STRUCTURE INCORPORATING A LENS

Gaylord B. Buck, II, Cleveland Heights, Ohio, assignor to General Electric Company, a corporation of New York Application August 7, 1947, Serial No. 767,207

2 Claims. (Cl. 88—23)

My invention relates to photoelectric or light sensitive cells of the barrier or blocking layer type for use in instruments for making illumination and other measurements.

Light sensitive cells of this type have two defects which, if left uncorrected, would seriously affect the accuracy of light meters in which they are used, particularly when measuring heterogeneous light from a number of spaced apart sources. The first of these is the failure of the cells to respond to various wave lengths of light in the same manner that the human eye responds thereto. In other words the spectral sensitivity curve of the cells is different from the spectral sensitivity curve of the average human eye. In most cells this discrepancy arises from the greater response of the cell to blue light. Thus, the cells, in general, are said to be blue sensitive.

The second defect of such cells is their failure to respond as much as they should to light incident on their light sensitive surface at oblique angles to the normal at the point of incidence. When light strikes a surface at an oblique angle to the normal, the illumination on the surface is found by multiplying the illumination on a plane perpendicular to the direction of the light at the point of incidence on the surface by the cosine of the oblique angle of incidence. As the angle of incidence increases the illumination on the surface decreases. Plotting the illumination values measured in footcandles against the angle of incidence in degrees results in a curve known in photometry as the cosine curve. Because the cells fail to respond fully to light incident at oblique angles the light meters in which they are used fail to correspond to the values of the cosine curve and read relatively lower than they should as the angle of incidence increases. The error is greatest with light skimming the surface of the cell at near grazing angles and this error is increased by the usual protective housing and the clear cover glass for the cells which block and reflect some of such light.

Color correcting filters are available which give the cells an overall spectral response very close to that of the eye. Cells equipped with such filters are much less efficient than cells not so equipped, that is, the output of current of the color corrected cell is substantially lower than that of the uncorrected cell under the same illumination. The current output of the color corrected cell is still sufficient, however, for accurate measurement by current measuring instruments, such as microammeters, galvanometers and the like, rugged enough to withstand the physical shocks incident to transportation and manipulation of the light meters when making measurements. Meters comprising a color corrected single cell and a microammeter are commercially available and are in extensive use.

Correcting the response of the cell to light striking its light sensitive surface at an oblique angle so that the cell obeys the cosine law even for light at grazing angles could be accomplished, theoretically, by using a light diffusing medium over the light sensitive surface of the cell. The absorption of light by such mediums now available is so great, however, that a single cell so covered and provided, in addition, with a color correcting filter which also absorbs light generates such a low current that it cannot be accurately measured by an instrument rugged enough to be conveniently transported from place to place where lighting measurements are to be made. As far as I am aware the only practical instrument in which correction is made for color as well as for oblique angles of incidence up to 90° of light to be measured is one comprising six cells electrically connected together, individually color corrected by suitable filters and mounted in a housing provided with a light diffusing cover plate. The current generated by the six cells may be accurately measured by a suitable microammeter.

Figure 2:
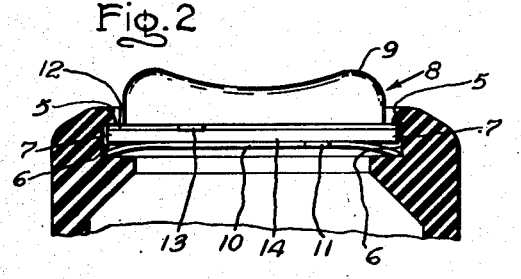

An object of my invention is to provide a light sensitive cell of the barrier layer type which is corrected for oblique angles of incidence of light up to 90° to its light sensitive surface and generates sufficient current, even when a color correcting filter is used, for measurement by an instrument rugged enough for handling. Another object of my invention is to provide a compact light meter incorporating such a corrected cell. Further objects and advantages of the invention will appear from the following description of a species thereof and from the accompanying drawing in which Fig. 1 is a front elevational view of a light meter incorporating my new light sensitive cell; Fig. 2 is a fragmentary, partly sectional view of the upper portion of the meter shown in Fig. 1 showing the light sensitive cell in side elevation and Fig. 3 is a top plan view of the meter shown in Fig. 1 with the back of the casing removed.

Referring to Fig. 1 of the drawing the light meter comprises an opaque casing 1 of electrically insulating material, such as an organic plastic, having a transparent glass covered opening 2 in its front face and behind which are positioned the dial 3 and the indicating needle 4 of a microammeter (not shown) mounted within the casing 1. The dial 3 is calibrated so as to be readable directly in foot candles.

Figure 3:
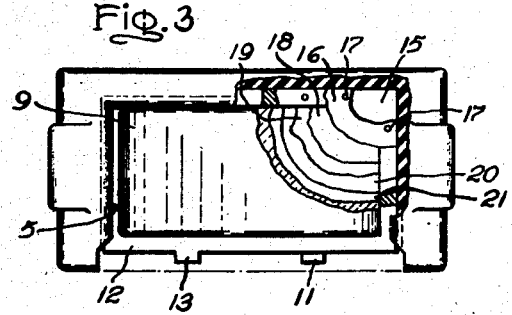

The top of the casing has a rectangular shaped aperture the sides 5 of which are provided with grooves 6 for accommodating the edge portion 7 of the light sensitive cell 8 as shown in Figs. 2 and 3. The cell 8 is held firmly in the grooves with a part 9 of the cell extending upward through the aperture by a curved resilient metal holding member 10 pressing against the bottom of the cell 8 and the bottom of the grooves 7 in the shorter sides of the aperture as shown in Fig. 2. With the back of the casing 1 removed, as shown in Fig. 3, the cell 8 and the holding member 10 may be easily inserted into and removed from the casing 1.

The holding member 10 also serves as an electrical conductor between the cell 8 and the microammeter (not shown) mounted below the cell and is provided with an outwardly extending contact portion 11 for engaging a terminal of the microammeter. A rectangular shaped metal strip 12 conforming in shape to the edges 7 of the cell 8 is clamped between the said cell edges 7 and the grooves 6 (Fig. 2). The strip 12 surrounds the lower part of the cell portion 9 extending through the aperture and also has a contact portion 13 for engaging the other terminal of the microammeter.

The light sensitive cell 8 is of a well known type and is made up of a support strip 14 of iron coated on its upper surface with a layer 15 of selenium and a thin, light pervious coating 16 of silver or other suitable noble metals and provided near its edges with electrical contacts 17 of evaporated cadmium (Fig. 3). These contacts 17 are electrically connected by the metal strip 12 described above. When light strikes the selenium 15 the latter generates a current of electricity which flows through the iron base 14 to the metal holding member 10 and through the cadmium contacts 17 to the rectangular shaped metal strip 12. The current is measured by a microammeter in casing 1 and connected across the contact portions 13 and 11 of the strip 12 and the holding member 10, respectively. The selenium 15 is protected from weather and moisture by a thin, light transmitting lacquer film 18. Such cells are commercially available and the characteristics thereof are well known.

In accordance with my invention a stripping film of organic plastic material, such as rubber cement, is first applied to the cadmium contacts 17 and a thin coating 19 of cement of the proper clarity and refractive index, such as Canada balsam, Columbia resin, or a vinylite plastic, is then applied to the lacquer film 18. Dyed filter material 20, such as gelatin or thin plastic, is then placed on the cement layer 19 in such manner as to cover the light sensitive surface 15 of the cell 8 but to leave the cadmium contacts 17 exposed for engaging the contact member 12 when the stripping film is removed. A thin layer 21 of cement, such as Canada balsam or the like is applied to the filter material 20 and a cover 9 of transparent glass or organic plastic, such as methyl methacrylate, in the form of a lens is placed on this layer 21 of cement and covers the filter 20. Force is then applied to press the above described elements together and remove any air bubbles. After the cement has hardened the unit is released from the pressing force and the stripping material removed from the cadmium contacts 17. The laminated cell 8 is then ready for use in the meter, though where severe weathering is anticipated, for example in outdoor use of the cell, I prefer to seal the edges of the cell with a weather resistant organic plastic, such as a methacrylate, or a glyptal lacquer.

The above described laminated structure minimizes optical losses caused by reflection of light at the interfaces of light transmitting bodies of different refractive index. Thus, more light absorption by the light sensitive surface of the cell is assured by eliminating all the interfaces except the final one between the air and the cover 9. This is of particular importance with light coming to the cell at grazing angles to its surface because more of such light is reflected by the interfaces. The cell of my invention is thus more efficient and sensitive than prior cell structure in which an air gap was present between the light sensitive surface of the cell and the filter and also the cover glass.

Forming the cover 9 as a lens increases the sensitivity of the cell 8 to light coming to it at oblique angles to its light sensitivity surface and particularly to light at grazing angles. While various lens shapes may be used depending upon the use to be made of the cell, the shape of the cell and the number of color correcting filters used, if any; I prefer the lens shape shown in the drawing which is in the form of a rectangular piece of organic plastic, such as methyl methacrylate, having a flat bottom for cementing to the cell, four flat sides and a top surface which is concave in its mid-portion and convex at its ends as best shown in Fig. 2.

The longitudinal edges of the top surface are rounded on a circular arc having a radius of about 0.07 of an inch. The element is preferably about 1.52 inches long, about 0.72 inch wide and the concave mid-portion of its top surface is cylindrical having a radius of about 1 inch. The end portions of the top surface are cylindrical having a radius of about 0.25 of an inch. The depth of the concave mid-portion is about 0.1 of an inch and the greatest height of the element measured from a plane including the highest points of its top surface to a plane including the lowest point of its rounded ends is approximately 0.30 of an inch. The overall depth of the lens 9 is such that the rounded top surface is exposed above a plane including the top of the casing surrounding the aperture for the element as shown in Fig. 2.

The current response of the laminated cell described above closely follows the values of the cosine curve which are determined by the formula $$E = \frac{I}{d^2} \cos i$$

where E is the illumintion, I is the intensity of the light, $d$ is the distance from the light source and $i$ is the angle between the incident ray and the normal to surface at the point of incidence. The response of the cell 8 matches the cosine curve exactly up to angles of incidence of 30 degrees and is correct to within 84 to 96 per cent for angles of incidence of from 30 to 90 degrees.

What I claim as new and desire to obtain by Letters Patent of the United States is:

1. A light sensitive cell of the barrier layer type of rectangular shape and having a laminated structure including a rectangular shaped lens over its light sensitive surface, said lens being approximately 1.52 inches long and approximately 0.72 inch wide and the light receiving surface thereof having a transverse concave cylindrical center portion having a radius of approximately 1 inch and transverse convex cylindrical end portions having a radius of 0.25 inch.

2. A light sensitive cell of the barrier layer type of rectangular shape and having a laminated structure including a rectangular shaped lens over its light sensitive surface, said lens being approximately 1.52 inches long and approximately 0.72 inch wide and the light receiving surface thereof having a transverse concave cylindrical center portion having a radius of approximately 1 inch and transverse convex cylindrical end portions having a radius of 0.25 inch, the longitudinal edges of said surface being convex and having a radius of 0.07 inch.

GAYLORD B. BUCK, II.

REFERENCES CITED

The following references are of record in the file of this patent:

UNITED STATES PATENTS

| Number | Name | Date |
|---|---|---|
| 563,836 | Blondel | July 14, 1896 |
| 1,870,247 | Froget | Aug. 9, 1932 |
| 1,990,361 | Bailey | Feb. 5, 1935 |
| 2,030,250 | Goodwin | Feb. 11, 1936 |
| 2,214,283 | Norwood | Sept. 10, 1940 |
| 2,222,788 | Tonceda et al. | Nov. 26, 1940 |

FOREIGN PATENTS

| Number | Country | Date |
|---|---|---|
| 26,965 | Great Britain | Nov. 23, 1912 |

OTHER REFERENCES

"Ueber Photoelektrische Belichtungsmesser," by B. Lange, on pages 816, 818 of Photographische Industrie—J. G. 31, 1933.